Nov. 25, 1941.   R. M. KINTZ   2,264,082
SUPPORT
Filed March 11, 1939   2 Sheets-Sheet 2
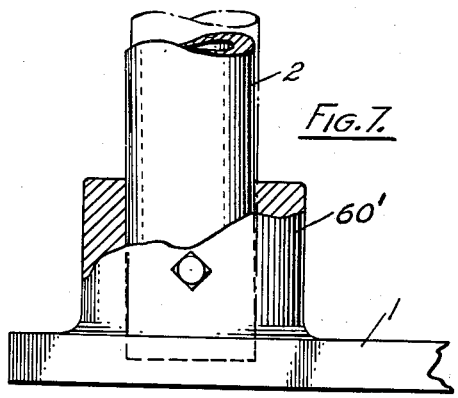
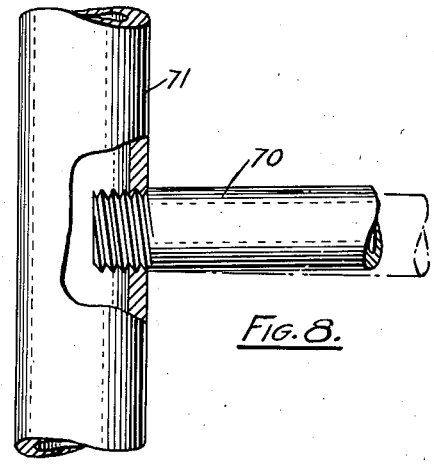
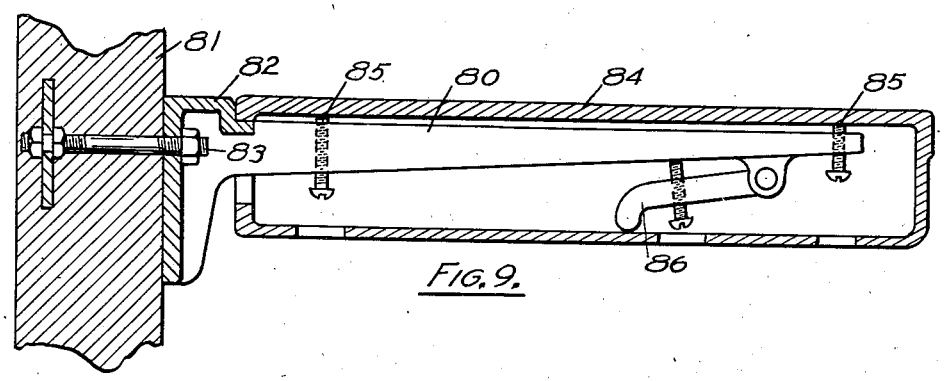
INVENTOR.
Robert M. Kintz
BY Florian G. Miller
ATTORNEY.

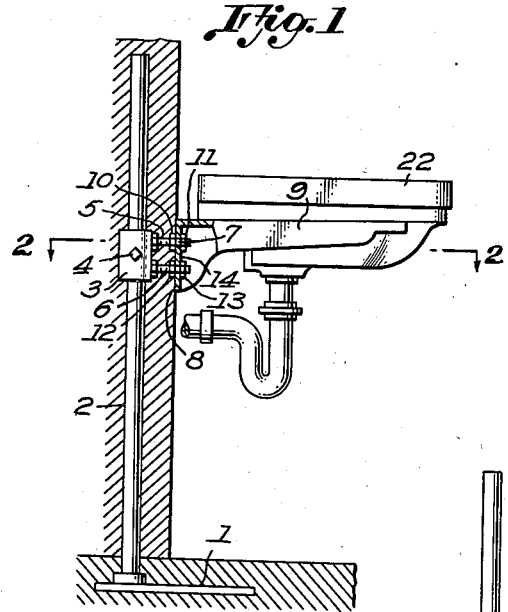

Patented Nov. 25, 1941

2,264,082

UNITED STATES PATENT OFFICE 2,264,082

SUPPORT

Robert M. Kintz, Erie, Pa., assignor to J. A. Zurn Manufacturing Company, Erie, Pa., a corporation of Pennsylvania Application March 11, 1939, Serial No. 261,401

2 Claims. (Cl. 248—125)

This invention relates generally to supports, and more particularly to wall supports for plumbing fixtures.

All devices of this character made according to the prior art, and with which I am familiar, have required at least some support from the adjacent wall with the result that the adjacent wall would be damaged when a heavy force was exerted on the object to be supported, especially when the force was exerted on the outer side of the object to be supported. This support from the wall provided a very weak support and if there was any adjustment for height, width or the like, it was very difficult to make the adjustment. Those supports which did not require wall support have been so costly that few have appeared on the market since the extra false walls necessary were costly, these extra walls being utilized to cover the unsightly supporting structure. These prior supporting structures did not provide a clear space underneath the object to be supported whereby storage space could be provided and cleaning made easy. All of these prior supports were of the construction that the weight of the object to be supported would invariably cause the top face thereof to be out of a horizontal plane and the vertical members supporting the object would tilt in the direction of the weighted object further causing the upper face of the object to assume a position out of the horizontal plane.

This application is a continuation in part of application for patent filed on October 15, 1937, by Robert M. Kintz, Serial Number 169,217.

In view of the above defects in present supports, it is, accordingly, an object of my invention to overcome the above and other defects in wall supports for plumbing fixtures and the like, and it is more particularly an object of my invention to provide a support for a fixture which is invisible, durable, strong, and which permits the upper face of the object to be supported to assume a position in a horizontal plane.

Another object of my invention is to provide a support for a fixture which is simple in construction, cheap in cost, and easy to install.

Another object of my invention is to provide a wall support which is entirely independent of all other means of support.

Another object of my invention is to provide arms for a support which provide universal adjustment of the fixture to be supported in a horizontal plane.

Another object of my invention is to provide a wall support for a fixture which provides a clear space underneath the supported fixture.

Another object of my invention is to provide a novel supporting means or arms for a wall support for fixtures wherein adjusting means are provided on all corners of the fixture to be supported.

Other objects of my invention will become evident from the following detailed description, taken in conjunction with the accompanying drawings, in which Fig. 1 is a view in side elevation with parts broken away of my novel support.

Fig. 2 is a plan view of the support with parts broken away.

Fig. 3 is a view in front elevation of my novel support.

Fig. 4 is a perspective view of one leg of my novel support.

Fig. 5 is a side elevational view partly in section showing a double support and a universally adjustable arm.

Fig. 6 is another modified form of support in side elevation.

Fig. 7 is a side elevational view partly broken away showing my novel supporting means for the vertical legs of my support.

Fig. 8 is a view in side elevation with parts broken away showing a modified form of securing means for the supporting arms.

Fig. 9 is a view in vertical section of my novel universally adjustable arm.

Referring to the drawings, Fig. 1 shows bases 1 having upwardly extending supporting legs 2 with sleeves 3 slidably mounted thereon, the sleeves 3 having set-screws for locking them in any desired position on the legs 2. The sleeves 3 have threaded, laterally extending lug members 5 and 6 in substantially parallel relation with each other for receiving the apertures 7 and 8 in the flanged supporting arms 9. Lock nuts 10, 11, 12, and 13 are threadably engaged with the stud members 5 and 6 and are disposed on opposite sides of the flanged portion 14 of the arms 9 to lock the arms 9 in any predetermined position. It will be evident that the arms 9 may be swung upwardly or downwardly by loosening the proper nuts 10, 11, 12 and 13 thereby permitting the full adjustment of the arms 9 in any direction. The sleeves 3 may be moved vertically to any desired position on the legs 2 thereby providing the height adjustment.

The sleeves 3 are also provided with laterally extending, relatively slidable members 15 and 16 having longitudinally slotted portion 17 and 18 and guiding lugs 19 and 20, a screw bolt 21 extending through the slotted portion 17 and 18 to secure the members 15 and 16 in a fixed position when the supporting legs 2 are at any desired distance from each other. It will be evident from the above that adjustments may be made in any desired direction with my novel support and all of the weight or force exerted by the fixture 22 will be exerted on the stud members 5 and 6 supported by legs 2 and no force whatsoever will be exerted on the wall adjacent the object or fixture to be supported. No obstructions or supports are disposed beneath the fixture 22 to be supported thereby leaving a clear space for receptacles or the like and permitting easy cleaning. The support is entirely invisible thereby permitting a fixture or the like to be supported without disclosing any supporting structure.

Fig. 5 is a modified form of wall support which is substantially the same as the wall support shown in Fig. 1 with the exception that the sleeves 30 have studs 31 and 32 and 33 and 34 extending laterally in opposite directions from the sleeves 30 in order to provide a support on both sides of the wall 35. A modified form of arm 36 is also shown which extends through the aperture 37 in the supported fixture 38. The flanged portion 39 of the arm 36 has apertures 40 and 41 which receive the studs 33 and 34 and lock nuts 42, 43, 44, and 45 are disposed on the studs 33 and 34 on each side of the flanged portion 39 to secure the arms 36 in any desired position. Adjusting screws 46 and 47 are disposed on the arms 36 and an adjusting arm 48 with an adjusting screw 49 provide a further means of adjustment, the adjusting screws 46 and 47 and the adjusting arm 48 operating oppositely from each other to securely hold the fixture 38 in a fixed position. No movement of the fixture 38 in any direction is permitted by the supporting structure.

Fig. 6 is another modified form of support wherein stud bolts 50 and 51 are anchored by plates 52 and 53 in the wall 54. The arm 55 has a flanged portion 56 with apertures 57 for receiving the stud bolts 50 and 51. Lock screws 58, 59, 60 and 61 are disposed on the studs 50 and 51 on the opposite sides of the flanged portion 56 of the arm 55 to lock the arm 55 in any desired position.

Fig. 7 shows an enlarged view of the base plate 1 and the supporting leg 2 disposed therein. The apertures 60' are pitched away from a vertical plane and away from the side of the support whereon the fixture is mounted in order that the vertical legs 2 will assume a vertical position when the fixture is supported thereon. The leg 2 in full lines shows the leg 2 as it is inserted into the aperture 60 and the leg in dotted lines shows the position of the legs 2 when the fixture is supported thereon. The pitch most desirable has been found to be about one-sixteenth inch in two inches although it will be evident that this may vary to a certain degree. Since the apertures 60' are preferably cored apertures, it has been found that the pitch noted is absolutely necessary to position the face of the fixture in a horizontal position.

Fig. 8 is a view of an outwardly extending arm 70 pitched in a direction to cause arm 70 threadably engaged to the leg 71 to assume a horizontal position when the load is placed thereon.

Fig. 9 shows an arm 80 similar to the arm 36 in Fig. 5. In this figure, the arm is shown supported by the wall 81 by means of a flange 82 and stud 83. The immovable support for the arm 80 is shown to bring out the fact that the face of the fixture 84 may be levelled by the use of the screws 85 and the clamp 86.

It will be apparent from the above description that I have provided a wall support which permits considerable downward force to be exerted on the outer end of the object to be supported without tearing or damaging the wall, which permits adjustment in any direction, which is invisible, which supports a fixture so that the face of the fixture will be in a horizontal plane at all times, and which is simple and durable in construction.

Various changes may be made in the specific embodiment of the present invention without departing from the spirit thereof, or from the scope of the appended claims.

What I claim is:

1. A support comprising laterally adjustable legs, vertically adjustable sleeves on said legs, vertically aligned parallel stud members extending laterally from said sleeves, arms supported by said stud members, locking nuts for adjusting said arms in a horizontal plane and for locking said arms on to said studs, leveling screws extending above the surface of said arms for leveling an article to be supported thereon, and a locking device movable in a direction opposite to said leveling screws for locking said article to be supported on said arms.

2. A support comprising laterally adjustable legs, vertically adjustable sleeves on said legs, vertically aligned parallel stud members extending laterally from said sleeves, arms supported by said stud members, base members having apertures for receiving said legs, said apertures being pitched away from the vertical plane to cause the legs to assume a position in a vertical plane when an object to be supported is placed on said arms, locking nuts for locking said arms at any point and for adjusting the top surface thereof in a horizontal plane, screw means for leveling an article to be supported on said arms, and locking means movable opposite to the direction of said leveling screws for locking the article to be supported on said arms.

ROBERT M. KINTZ.